United States Patent
Culver et al.

(10) Patent No.: US 9,504,237 B2
(45) Date of Patent: Nov. 29, 2016

(54) RUBBER OR SOFT PLASTIC FISHING SPOON LURE

(76) Inventors: Steven R. Culver, Port Charlotte, FL (US); Eric M. Shinner, Port Charlotte, FL (US)

(*) Notice: Subject to any disclaimer, the term of this patent is extended or adjusted under 35 U.S.C. 154(b) by 186 days.

(21) Appl. No.: 13/573,213

(22) Filed: Aug. 30, 2012

(65) Prior Publication Data

US 2014/0059916 A1   Mar. 6, 2014

(51) Int. Cl.
 *A01K 85/14* (2006.01)
 *A01K 85/02* (2006.01)
 *A01K 85/00* (2006.01)

(52) U.S. Cl.
 CPC ........... *A01K 85/14* (2013.01); *A01K 85/00* (2013.01); *A01K 85/02* (2013.01)

(58) Field of Classification Search
 CPC ....... A01K 85/00; A01K 85/14; A01K 85/02
 USPC ............ 43/42.5, 42.24, 42.29, 42.39, 42.37, 43/42.38, 42.1, 42.41, 42.3, 42.53; D22/124, 125, 129–131
 See application file for complete search history.

(56) References Cited

U.S. PATENT DOCUMENTS

| | | | | |
|---|---|---|---|---|
| 326,886 A * | 9/1885 | Robinson | ............... | A01K 85/16 43/42.24 |
| 534,506 A * | 2/1895 | Hastings | ................. | 43/42.3 |
| 742,093 A * | 10/1903 | Henderson | ................... | 43/44.82 |
| 903,333 A * | 11/1908 | Slocum | ................... | A01K 85/00 43/42.24 |
| 1,184,588 A * | 5/1916 | Sprague | ................... | A01K 85/16 43/42.3 |
| 1,571,770 A * | 2/1926 | Fenner | ................... | A01K 85/02 43/42.1 |
| 1,593,604 A * | 7/1926 | Schreiner et al. | ............. | 43/42.3 |
| 1,615,747 A * | 1/1927 | Fenner | ................... | A01K 85/02 43/35 |
| 1,686,114 A * | 10/1928 | Walter | ................... | A01K 85/02 43/42.17 |
| 1,993,018 A * | 3/1935 | Pfeifle | ................... | A01K 85/16 43/42.1 |
| D117,378 S * | 10/1939 | Larson | ................... | D22/131 |
| 2,185,666 A * | 1/1940 | Hill, Jr. | ................... | 43/44.81 |
| 2,501,449 A * | 3/1950 | Lutz et al. | ................... | 43/42.3 |
| 2,554,049 A * | 5/1951 | Nacey | ................... | A01K 85/12 43/42.2 |
| 2,575,797 A * | 11/1951 | Corsi | ................... | A01K 85/02 43/42.3 |
| 2,693,048 A * | 11/1954 | Ansley | ................... | A01K 85/02 43/35 |
| 2,718,668 A * | 9/1955 | Burke | ................... | A01K 85/00 43/42.24 |
| 2,817,922 A * | 12/1957 | Takeshita | ................... | A01K 85/00 43/42.28 |
| 3,180,049 A * | 4/1965 | Gunderson | ................... | 43/42.3 |
| 3,197,909 A * | 8/1965 | Adams | ................... | A01K 83/00 43/42.37 |
| 3,289,345 A * | 12/1966 | Reininger | ................... | A01K 85/14 43/42.09 |
| 3,465,466 A * | 9/1969 | Showalter | ................... | 43/42.24 |
| 3,611,614 A * | 10/1971 | Ward | ................... | 43/42.24 |
| 3,724,117 A * | 4/1973 | Flanagan, Jr. | ........ | A01K 85/14 43/42.24 |
| 3,922,811 A * | 12/1975 | Ellingson | ............... | A01K 85/16 43/42.02 |
| 3,952,444 A | 4/1976 | Hameen-Anttila | | |
| 3,964,203 A * | 6/1976 | Williams, Jr. | ........ | A01K 85/14 43/42.02 |
| 3,978,606 A * | 9/1976 | Riggs | ................... | 43/42.24 |
| 4,060,928 A * | 12/1977 | Messler et al. | ............. | 43/42.24 |
| 4,094,087 A * | 6/1978 | Carpenter | ................... | 43/42.24 |
| 4,244,133 A * | 1/1981 | Martinek | ................... | 43/42.39 |
| 4,334,381 A * | 6/1982 | Carver et al. | ............... | 43/42.29 |
| 4,367,607 A * | 1/1983 | Hedman | ................... | 43/42.24 |
| 4,450,645 A * | 5/1984 | Ancona | ................... | A01K 85/00 43/42.25 |
| 4,573,283 A * | 3/1986 | Pippert | ................... | A01K 85/18 43/42.09 |

(Continued)

*Primary Examiner* — Darren W Ark

(57) ABSTRACT

A weedless rubber or soft plastic fishing spoon lure.

18 Claims, 11 Drawing Sheets

(56) References Cited

U.S. PATENT DOCUMENTS

| | | | | |
|---|---|---|---|---|
| 4,589,223 A * | 5/1986 | Hastings | | 43/42.24 |
| 4,653,212 A * | 3/1987 | Pixton | | 43/42.24 |
| 4,672,768 A | 6/1987 | Pippert | | |
| 4,700,503 A * | 10/1987 | Pippert | | A01K 85/18 |
| | | | | 43/42.5 |
| 4,771,568 A * | 9/1988 | Head | | A01K 85/00 |
| | | | | 43/42.29 |
| 4,783,928 A * | 11/1988 | Weaver | | 43/42.24 |
| 4,841,665 A * | 6/1989 | McGahee | | 43/42.24 |
| 4,845,883 A * | 7/1989 | Langer | | A01K 85/00 |
| | | | | 43/42.39 |
| 4,862,628 A * | 9/1989 | McGahee et al. | | 43/42.24 |
| 4,873,783 A * | 10/1989 | McGahee et al. | | 43/42.24 |
| 4,885,866 A | 12/1989 | Vanderplow | | |
| 4,907,364 A * | 3/1990 | Hedman | | 43/42.39 |
| 4,926,578 A * | 5/1990 | Morse | | A01K 85/00 |
| | | | | 43/42.24 |
| 5,009,024 A * | 4/1991 | Parman | | A01K 85/00 |
| | | | | 43/42.24 |
| 5,025,586 A * | 6/1991 | Pixton | | 43/42.24 |
| 5,070,639 A * | 12/1991 | Pippert | | A01K 85/01 |
| | | | | 43/42.24 |
| 5,077,930 A * | 1/1992 | Berry | | A01K 85/14 |
| | | | | 43/42.39 |
| 5,113,615 A | 5/1992 | Drachkovitch | | |
| 5,129,175 A * | 7/1992 | Pixton | | 43/42.39 |
| 5,131,181 A * | 7/1992 | Steinke | | A01K 85/00 |
| | | | | 43/42.3 |
| 5,152,094 A * | 10/1992 | Strickland | | 43/42.24 |
| 5,220,743 A * | 6/1993 | McClellan | | 43/42.37 |
| D344,568 S * | 2/1994 | Byrd | | 43/42.37 |
| 5,335,443 A * | 8/1994 | Grigsby, Jr. | | 43/44.81 |
| 5,367,816 A | 11/1994 | Gabos et al. | | |
| 5,412,901 A * | 5/1995 | Matinez | | A01K 95/00 |
| | | | | 43/42.22 |
| 5,511,338 A | 4/1996 | Costanzo | | |
| 5,640,798 A * | 6/1997 | Garst | | A01K 85/00 |
| | | | | 43/42.24 |
| 5,784,827 A * | 7/1998 | Jimenez et al. | | 43/44.8 |
| 5,862,623 A * | 1/1999 | MacPherson | | 43/42.24 |
| 5,887,377 A | 3/1999 | Birko | | |
| 5,901,494 A * | 5/1999 | Reed | | 43/42.38 |
| 6,052,938 A * | 4/2000 | Marusak et al. | | 43/42.09 |
| 6,073,383 A * | 6/2000 | Line | | A01K 85/00 |
| | | | | 43/42.24 |
| 6,082,038 A * | 7/2000 | Link | | 43/42.3 |
| 6,122,857 A * | 9/2000 | Rhoten | | 43/42.39 |
| 6,141,900 A * | 11/2000 | Rudolph | | 43/42.24 |
| 6,173,523 B1 * | 1/2001 | Johnson | | 43/42.3 |
| 6,226,918 B1 * | 5/2001 | Rigney | | 43/42.24 |
| 6,237,275 B1 * | 5/2001 | Chambers, Sr. | | 43/42.3 |
| 6,266,916 B1 * | 7/2001 | Dugan | | 43/42.37 |
| 6,269,583 B1 * | 8/2001 | Tashchyan | | 43/42.5 |
| 6,301,823 B1 * | 10/2001 | Monticello et al. | | 43/42.5 |
| 6,405,477 B1 * | 6/2002 | Huppert | | 43/42.24 |
| 6,571,508 B2 * | 6/2003 | Brinkman | | 43/42.24 |
| 6,836,996 B1 * | 1/2005 | Huppert | | A01K 85/00 |
| | | | | 43/42.39 |
| 6,895,711 B1 * | 5/2005 | Nakamichi | | 43/42.24 |
| 7,036,266 B2 * | 5/2006 | Falcon | | 43/44.81 |
| 7,080,476 B2 * | 7/2006 | King | | 43/42.3 |
| 7,104,004 B1 * | 9/2006 | Renosky | | 43/42.24 |
| 7,140,146 B2 * | 11/2006 | Gill | | 43/42.39 |
| 7,185,457 B2 * | 3/2007 | Nichols | | 43/42.39 |
| 7,263,798 B2 * | 9/2007 | Nichols | | A01K 85/18 |
| | | | | 43/42.24 |
| 7,266,922 B2 * | 9/2007 | Oelerich, Jr. | | A01K 85/00 |
| | | | | 43/42.24 |
| 7,272,910 B2 * | 9/2007 | Mell | | A01K 85/00 |
| | | | | 43/42.24 |
| D597,168 S * | 7/2009 | Gerard | | D22/125 |
| 7,774,974 B1 * | 8/2010 | Parks | | 43/42.24 |
| 7,793,457 B2 * | 9/2010 | Hogan | | 43/42.24 |
| 7,841,127 B1 * | 11/2010 | Nakamichi | | 43/42.24 |
| 7,845,107 B1 * | 12/2010 | Mell | | A01K 85/00 |
| | | | | 43/42.24 |
| 7,895,789 B2 * | 3/2011 | Langer | | A01K 85/00 |
| | | | | 43/42.28 |
| 8,020,338 B2 * | 9/2011 | Brown | | 43/42.24 |
| 8,087,200 B1 * | 1/2012 | Ferriss | | 43/42.39 |
| 8,132,356 B2 * | 3/2012 | Gill | | 43/42.53 |
| 8,230,639 B2 * | 7/2012 | Langer | | A01K 85/00 |
| | | | | 43/42.29 |
| D676,517 S * | 2/2013 | Cook, Jr. | | D22/132 |
| 8,544,204 B2 * | 10/2013 | Davis | | A01K 85/00 |
| | | | | 43/42.24 |
| 8,857,100 B2 * | 10/2014 | Huddleston | | 43/42.24 |
| 8,938,907 B2 * | 1/2015 | Meade | | 43/42.1 |
| 8,959,827 B1 * | 2/2015 | Hale | | 43/42.24 |
| 9,161,522 B2 * | 10/2015 | Moran, Jr. | | A01K 85/14 |
| D750,731 S * | 3/2016 | Dreisbach | | D22/130 |
| 2002/0073606 A1 * | 6/2002 | Mameamskum | | 43/42.5 |
| 2003/0084602 A1 * | 5/2003 | Reed | | 43/42.39 |
| 2004/0244269 A1 | 12/2004 | Whipple | | |
| 2006/0037231 A1 * | 2/2006 | Moore | | 43/42.3 |
| 2007/0169397 A1 * | 7/2007 | Mieczkowski | | 43/42.5 |
| 2009/0223108 A1 * | 9/2009 | Hastbacka et al. | | 43/42.24 |
| 2009/0307960 A1 * | 12/2009 | Oelerich et al. | | 43/42.24 |
| 2010/0146837 A1 * | 6/2010 | Zernov | | 43/42.24 |
| 2010/0269398 A1 * | 10/2010 | Ware | | 43/42.24 |
| 2011/0056115 A1 * | 3/2011 | Sebile | | 43/44.81 |
| 2011/0277372 A1 * | 11/2011 | Thomas | | A01K 85/01 |
| | | | | 43/42.31 |
| 2012/0005944 A1 * | 1/2012 | Carswell | | A01K 85/00 |
| | | | | 43/42.24 |
| 2012/0216442 A1 * | 8/2012 | Merritt | | 43/42.1 |
| 2013/0031822 A1 * | 2/2013 | Reeves et al. | | 43/42.24 |
| 2013/0180158 A1 * | 7/2013 | Butters | | 43/42.1 |
| 2013/0247443 A1 * | 9/2013 | Stokes | | 43/42.1 |
| 2013/0269236 A1 * | 10/2013 | Oblonskij | | 43/42.41 |
| 2014/0290119 A1 * | 10/2014 | Onishi | | A01K 85/14 |
| | | | | 43/42.52 |
| 2014/0345185 A1 * | 11/2014 | Marlin | | A01K 85/00 |
| | | | | 43/42.24 |
| 2015/0040464 A1 * | 2/2015 | Kennedy | | A01K 85/00 |
| | | | | 43/42.1 |
| 2015/0264903 A1 * | 9/2015 | Korteweg | | A01K 85/00 |
| | | | | 43/42.06 |

* cited by examiner

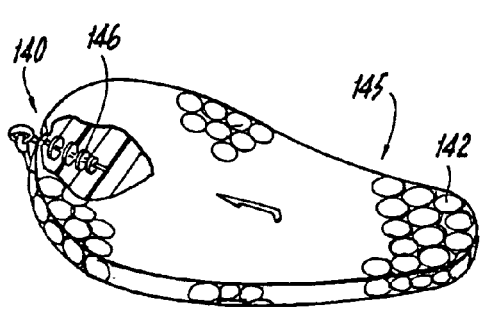
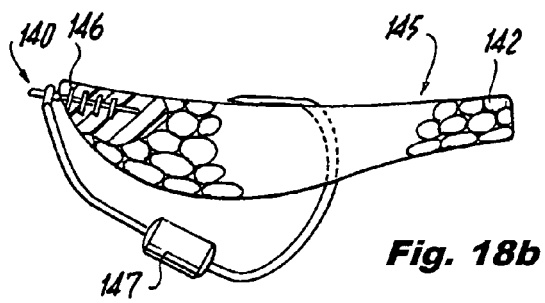
Fig. 18a  Fig. 18b
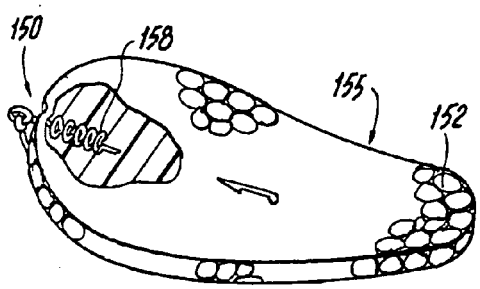
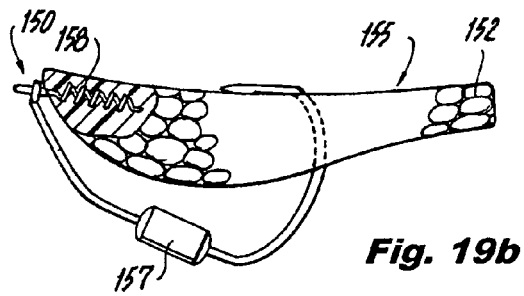
Fig. 19a  Fig. 19b
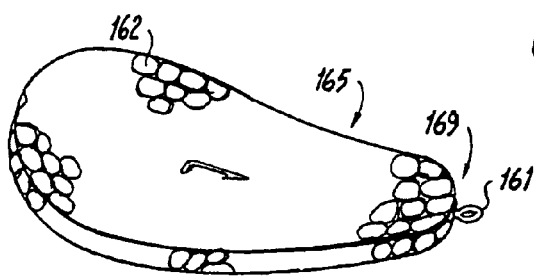
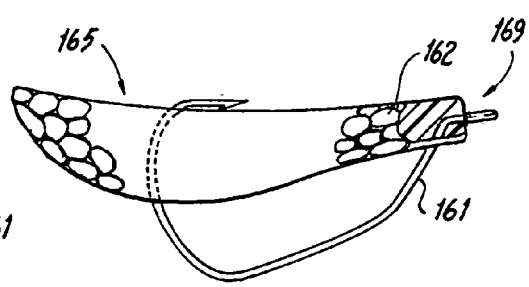
Fig. 20a  Fig. 20b
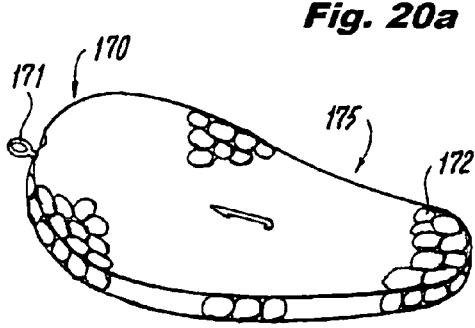
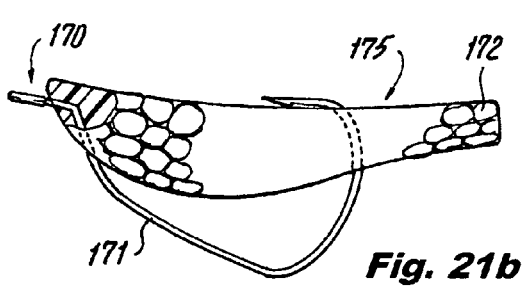
Fig. 21a  Fig. 21b

Fig. 41
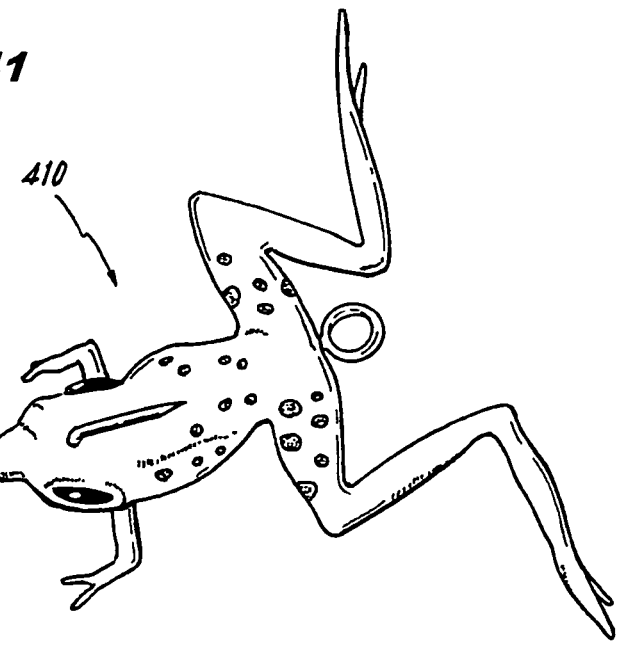
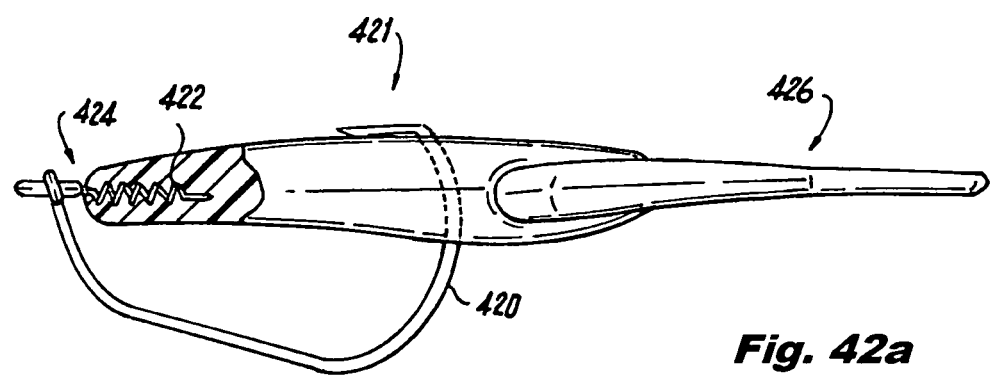
Fig. 42a
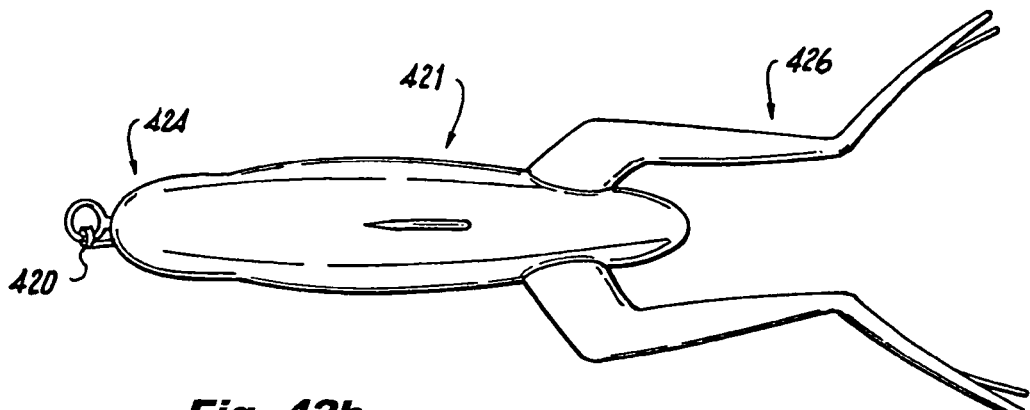
Fig. 42b

RUBBER OR SOFT PLASTIC FISHING SPOON LURE

FIELD OF THE INVENTION

The present invention relates to a weedless rubber or soft plastic fishing spoon lure.

BACKGROUND OF THE INVENTION

Artificial or plastic worms, jigs are some of the most popular and versatile fishing lures today. The majority of fishing lures can be placed into one of the general categories including jigs, plugs, spoons and top water fishing lures. Jigs typically consist of a fishing hook having an eyelet and a shank portion having a weighted leadhead leaving the eyelet uncovered and attachable to a fishing line. Plug lures generally have a full bodied wooden or plastic member simulating a live fish with fishing hooks attached to various portions of the full bodied member. Top water lures are made of various types of material and body shapes which allow the lure to flow on the surface of the water with fishing hooks attached to different parts of the body. Spoon lures generally have a thin spoon shaped body member with a fishing hook attached to the rear of the thin body member. Spoon lures are particularly useful in pike, walleye, bass, and trout fishing because of their particular color scheme of the spoon lure to attach fish rather than relying on a lifelike appearance.

A great many kinds of spoons and mounting mechanisms for spoons have been made in a variety of shapes and sizes. When a spoon is the principal component of the lure, it typically flutters and may spin or revolve about an axis which extends along the length of the spoon. When used as an important, but not the principal, fish-attaching component of a lure having other fish-attaching components, a spoon revolves around a principal axis (a spindle or an imaginary line). In the latter case, the spoon is often referred to as a spinner. As used herein, the term "spoon" refers to both sorts of uses unless the context or surrounding structure dictates one specific use.

The mounting holes of spoons of the prior art are typically round, and serve only for attachment purposes. The clevis or other attachment loop extends freely through such mounting holes. Attachment of a spoon onto the clevis or other attachment loop often requires the use of hand tools. The process of changing a spoon may be somewhat time-consuming and inconvenient.

Fishing lures have traditionally been made either of hard or rigid materials, such as metal or hard plastic or of a resilient material such as plastic or rubber. The resilient materials are preferred by many fishermen because of the versatility in shape and coloration and more natural action of the lures, due to their flexibility. For example, lures of resilient materials can be made to stimulate the natural prey of fish, such as worms, shrimp, shad, lizard or small bugs, and they also can be appropriately colored. Alternatively, the resilient materials may be made of a highly attractive color and have any geometric configuration. They are relatively inexpensive to produce. The metal lures, in contradiction, are generally formed only in a geometric configuration known as a "spoon". These metal lures must then generally be colored, for example, by lacquering, or treated to stay shiny so as to attract the attention of the fish.

While each of these types of lures is well known for its advantages, they have their respective disadvantages. The flexible plastic lures are generally rather light in weight (low mass) and therefore are difficult to cast to achieve any distance and degree of accuracy in lure placement. They tend to rise towards the surface as they are pulled through the water and thus may not stay at a depth suitable for attracting fish. They also lack strength and may be torn apart by a partial strike or by encountering a submerged snag. The metal lures, on the other hand, have the necessary strength and weight (high mass) but lack variety and realism in shape, color and action.

Spoon-type baits are generally made from solid metal or hard plastic. Their peculiar convex shape and their specific gravity, coupled with the shiny metal finish of the lure, attracts fish because of the vibrations created as the lure undulates through selected depths in the water column. However, because the traditional spoon is formed of hard, non-pliable metal, an angler is typically unable to alter the concavity to suit a particular situation. Additionally, because a spoon is generally cast of hard, non-pliable metal, a striking fish is able to distinguish a hard spoon from an actual bait fish and may consequently attempt to spit the lure out. The hard metal feel of a spoon may deter a fish from re-striking in the event the first strike is unsuccessful.

U.S. Patent Publ. 2004/0244269 relates to a fishing lure and hook method and apparatus. A fishing lure and hook combination includes a fishing hook having a shank with a pointed end, said shank having an eye on the other end thereof. The fishing lure has a front portion having an elongated bore there through for receiving a fishing line there through and a rear portion having a slit in the back thereof interesting the front portion bore and sized for the fish hook eye to slide sideways therein. The fishing weight has an enlarged hollow area at the intersection of the front portion elongated bore and the rear portion slit sized for the fish hook eye to rotate therein so that sliding the hook of the eye sideways into the rear portion of the slit and rotating the eye, locks the fish hook to the lure.

U.S. Pat. No. 5,511,338 relates to a spoon fishing lure assembly which includes a body member having a front end with a front aperture there through and a rear end with a rear aperture there through. The fishing lure includes a simulated eye assembly and means for securing and sealing the simulated eye assembly to the body member. The simulated eye assembly has a base, a transparent cover and a rim portion. The simulated eye assembly also includes a ball freely disposed in the chamber. The fishing lure also includes the fishing hook having a shank portion and a skirt member. The fishing lure also includes a crimped member.

U.S. Pat. No. 5,367,816 relates to a spoon lure for fishing comprised of a wedge shaped strip of highly reflective metal or any other suitable material that is bent to a radius along its length and width, with a rudder at the wide end of the wedged set at an angle to the length of the body and rolled in the opposite direction of the radius. At the narrow end of the wedge, or the leading edge, there is a hole for fastening a swivel device which in turn is fastened to a fishing line at the wide end, or trailing edge, there are two holes for fastening a hook. This configuration results in a lure that will spin through the water with a tight pattern when the hook is placed in the center hole and a slower spin when the hook is placed in the corner hole.

U.S. Pat. No. 5,113,615 relates to a spinning spoon comprising a shaft having a hook mounted on one end thereof and an eye at its opposite end for fixing to a fishing line, a blade and a swivel connecting one end of the blade to the shaft adjacent to the eye in such a manner to enable the blade to rotate about the shaft under the effect of the resistance of the water through which the spoon moves.

U.S. Pat. No. 3,952,444 relates to a spoon lure with spring loaded hooks connected to a plunger extending along the lure. The hooks are loaded by pulling or pushing the plunger in a direction away from or towards the hooks against the force of the spring and they are locked into the loaded portion by pushing a latch into a notch provided by the plunger.

U.S. Pat. No. 4,885,866 relates to a fishing lure including a spoon with a mounting hole and a substantially rigid attachment loop extending loosely there through. The inter-engaging portions of the spoon mounting hole and/or attachment loop have non-circular shaping which focuses the engagement of the loop and mounting hole toward the center point of the leading edge of the mounting hole as the lure apparatus is drawn through the water.

U.S. Pat. No. 4,672,768 relates to a fishing lure formed by a head/hook member having integral projections with inter-engage in preformed bores in a body member of resilient material so as to maintain the unitary integrity of the assembly. The head/hook member is preferably made of metal to provide necessary ballast for the lure. The body member is preferably formed of a material such as plastics or rubber. The body member has preformed bores which receive portions of the head/hook member.

U.S. Pat. No. 5,887,377 relates to fishing lures comprising a lure body having a connector for connecting a fishing line to the lure body and at least one hook device including a hook shank with an attachment device, and at least one hook tip shaft with barb equipped tip, which hook device is non-releasably secured to the lure body by the attachment device.

U.S. Pat. No. 6,301,823 relates to a spoon fishing lure which includes a pliable core encased within a soft or rubbery body. The pliable core allows adjustment to the shape of the spoon to allow different wobble and swim patterns in the water. The core, which may be made of thinly drawn metal or wire, may bare visually enhancing decals. Rings at the ends provide a place to attach tackle.

U.S. Pat. No. 4,845,883 relates to a fishing lure made of a soft, non-rigid material shaped and weighted to glide in water. Weights precisely balance the lure to produce the glide and to stabilize deflection of the lure caused by any tendency of the soft non-rigid material to deflect. A hook for catching fish is attached to the lure and provides the means for connecting the lure to a fishing line.

SUMMARY OF THE INVENTION

The present invention relates to a weedless rubber or soft plastic fishing spoon lure.

It is an object of the present invention for the lure to be used for fishing in heavy cover.

It is an object of the present invention for the lure to be made of plastisol.

It is an object of the present invention for a hook to be attached by the angler to the lure.

It is an object of the present invention for a hook to be directly attached to the lure.

It is an object of the present invention for the hook to be attached to the lure by placing the hook through the lure.

It is an object of the present invention for the hook to be used to be a wide gap hook.

It is an object of the present invention for the hook to comprise a push in post, Z-shaped bend, or a cork screw attachment that is attached on the hook eye of wide gap hooks. The push in post style hook is also attached on the hook eye.

It is an object of the present invention for the device to be used in fresh or salt water.

It is an object of the present invention for the hook to be designed for a weedless application for soft plastic baits.

It is an object of the present invention for the lure of the present invention to replace a surface lure, metal good spoon lure, jerk shad lure and jig and tail lure due to its versatility.

It is an object of the present invention for the lure to be retrieved as a surface lure.

It is an object of the present invention for the lure to be retrieved as a subsurface lure like a golden spoon lure.

It is an object of the present invention for the lure to be retrieved in a stop and go, or jerk of the rod like the jerk shad lure.

It is an object of the present invention for the lure to be jigged off the bottom in the manner of a jig and shad tail to be retrieved.

It is an object of the present invention for the dimensions of the lure to be approximately $3^{3/8}$" by $1^{1/4}$" by $½$".

It is an object of the present invention for the lure to be made by a two piece mold.

It is an object of the present invention for the mold to be made of aluminum.

The lure of the present invention can be used for fishing in thick cover such as heavy weed growth, slop, timber, wooded pockets, underneath over hangs and mangrove lined shorelines and reeds. It is an object of the present invention to use a wide gap hook for the lure to provide a means for attaching line to lure and the wide gap hook is used for the application of rigging weedless. The lure is made of a soft pliable material and designed with such a material so the lure is fished with a higher success rate compared to a hard or rigid spoon. The lure is rigged and also being a soft lure a fish is more likely to hold on to the lure longer than a hard or rigid bait. The shape and sizes of lures are suggestive of many different types of bait fish in fresh and salt water. The lure can also be fished on a conventional lead jig head. The lure can represent a frog type top water bait with a trailer system. The soft plastic spoon lures can be produced in different sizes and can also be adapted by registration lines in the mold so the angler can split the soft plastic spoon in a v shape to change the performance and look of the soft plastic spoon. The adaption of the lures by splitting the lure in a v shape can be used in any combination explained by hook types used for weedless application or with a lead jig head. The frog adaption is for a weedless application. The split tail application can be for weedless application to represent a crayfish on a weedless wide gap hook or a traditional lead jig head. Lure can be adapted to look like a frog, crayfish or without adaptions representative of several types of bait fish in fresh and saltwater and also suggestive due to the sizes. Lure can be rigged from the front side of soft spoon or the back side of soft spoon.

It is an object of the present invention for the lure to have different eye attachments.

It is an object of the present invention for the lure to have different tails.

It is an object of the present invention for the lure to have different ribbing.

It is an object of the present inventions for the lure to have different scale patterns.

BRIEF DESCRIPTION OF THE DRAWINGS

FIG. 18a shows a plan view of a large spoon soft plastic salmon egg spoon body.

FIG. 18b shows a side view of a large spoon soft plastic salmon egg spoon body.

FIG. 19a shows a plan view of a large spoon soft plastic salmon egg spoon body.

FIG. 19b shows a side view of a large spoon soft plastic salmon egg spoon body.

FIG. 20a shows a plan view of a large spoon soft plastic salmon egg spoon body.

FIG. 20b shows a side view of a large spoon soft plastic salmon egg spoon body.

FIG. 21a shows a plan view of a large spoon soft plastic salmon egg spoon body.

FIG. 21b shows a side view of a large spoon soft plastic salmon egg spoon body.

FIG. 41 shows an embodiment of a frog style lure.
FIG. 42a shows a side view of a frog style lure.
FIG. 42b shows a plan view of a frog style lure.

DETAILED DESCRIPTION OF THE INVENTION

Figure 1:
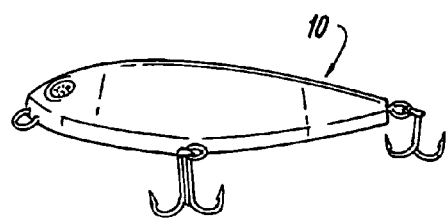
FIG. 1 relates to a prior art surface lure.

FIG. 1 shows a prior art surface lure 10.

Figure 2:
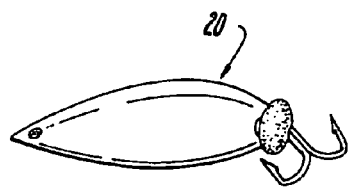
FIG. 2 relates to a prior art metal gold spoon.

FIG. 2 shows a prior art metal gold spoon 20.

Figure 3:
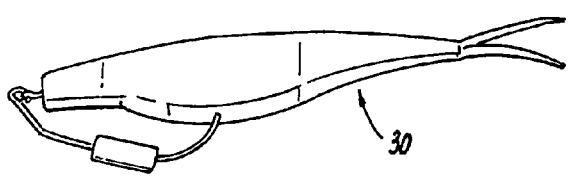
FIG. 3 relates to a prior art a jerk shad or jerk bait.

FIG. 3 shows a jerk shad or jerk bait 30.

Figure 4:
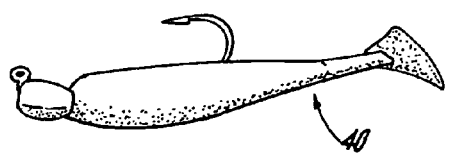
FIG. 4 relates to a prior art jig and shad tail.

FIG. 4 shows a prior art jig and shad tail 40.

Figure 5:
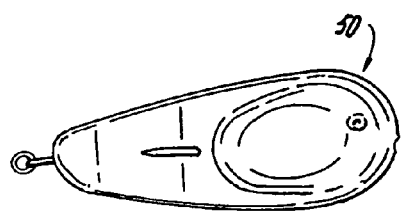
FIG. 5 shows the lure of the present invention.

FIG. 5 shows the lure 50 of the present invention.

Figure 6:
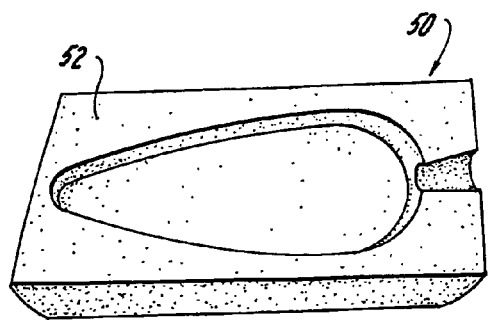
FIG. 6 shows one side of the mold of the present invention.

FIG. 6 shows the top side 52 of the lure 50.

Figure 7:
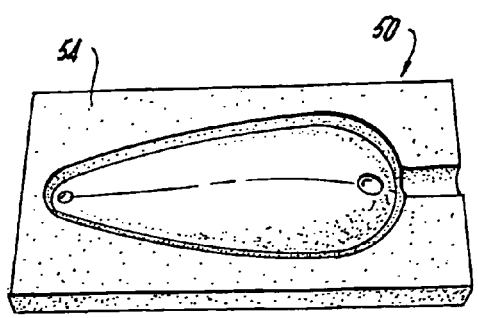
FIG. 7 shows one side of the mold of the present invention.

FIG. 7 shows the bottom side 54 of the lure 50.

Figure 8:
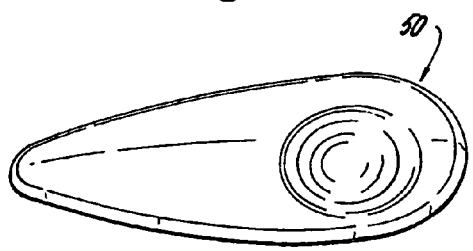
FIG. 8 shows the lure of the present invention.

FIG. 8 shows the lure 50.

Figure 9:
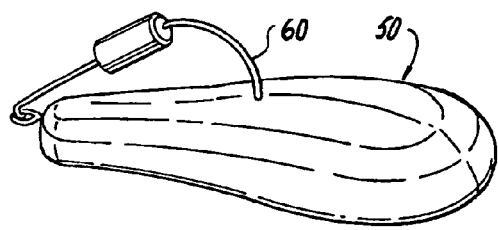
FIG. 9 shows the lure of the present invention with the hook attached.

FIG. 9 shows the lure 50 having a hook 60 through the lure 50.

Figure 10:
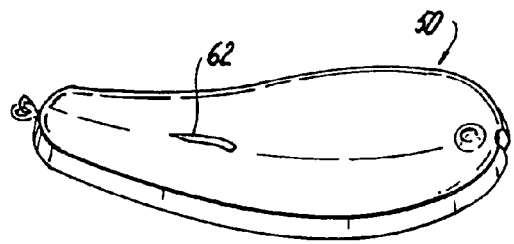
FIG. 10 shows the lure of the present invention with the hook attached.

FIG. 10 shows the lure 50 having a hook 62 through the lure.

Figure 11:
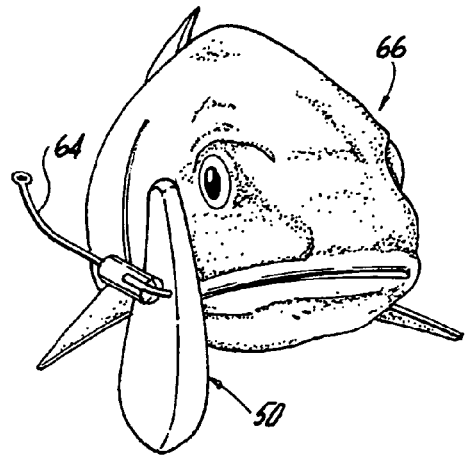
FIG. 11 shows the lure of the present invention with the hook attached and a fish caught with the lure.

FIG. 11 shows the lure 50 having a hook 64 used to catch the fish 66.

Figure 12A:
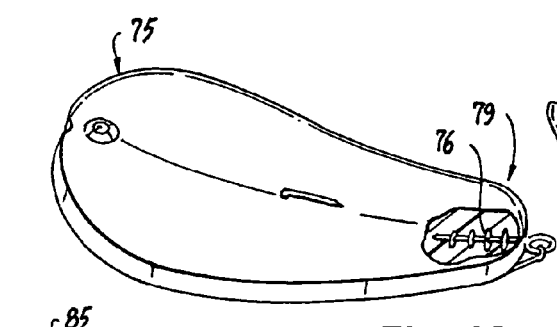
FIG. 12a shows a plan view of a large soft plastic spoon.

FIG. 12a is an embodiment of a large spoon lure 75, the front 79 of lure 75 has a post mount wide gap hook 76.

Figure 12B:
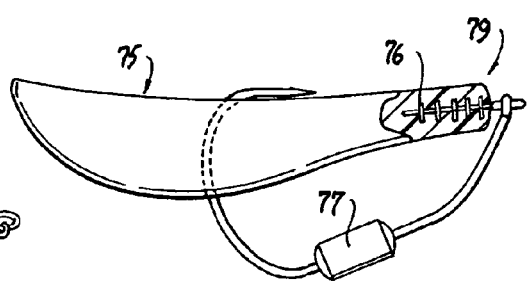
FIG. 12b shows a side view of a large soft plastic spoon.

FIG. 12b shows a side view of the lure 75 showing the front of the lure 79 having a post mount wide gap hook 76 and an adjustable lead weight 77 which can be slid up and down the shank to change the action of the lure.

Figure 13A:
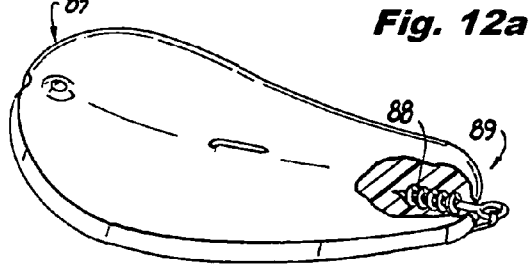
FIG. 13a shows a plan view of a large soft plastic spoon.

FIG. 13a relates to an embodiment of a large spoon lure 85 which has a cork screw style wide gap hook 88 toward the front of the lure 89.

Figure 13B:
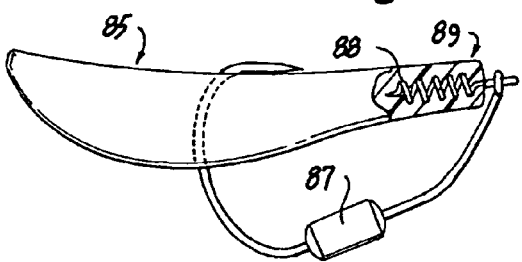
FIG. 13b shows a side view of a large soft plastic spoon.

FIG. 13b shows a side view of the lure in 13a further comprising an adjustable lead weight 87 wherein the weight can be slid up and down the shank to change the action of the lure.

Figure 14A:
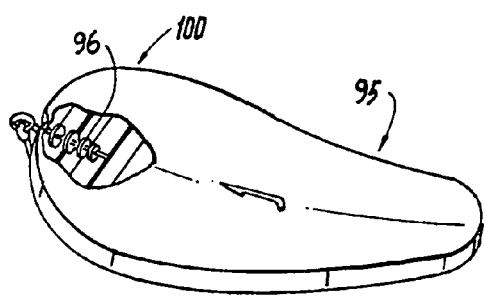
FIG. 14a shows a plan view of a large soft plastic spoon.

FIG. 14a shows a large spoon lure 95 with a rear application 100. The lure 95 has a post mount wide gap hook 96 at the rear 100 of the lure 95.

Figure 14B:
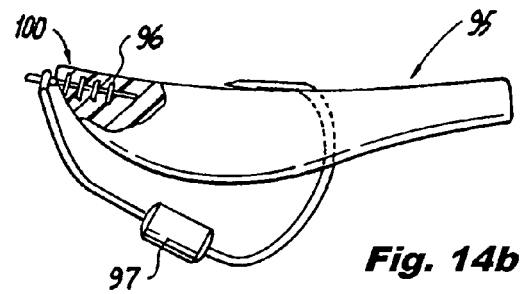
FIG. 14b shows a side view of a large soft plastic spoon.

FIG. 14b shows the lure of 14a with an adjustable lead weight 97 which can be slid up and down the shank to change the action of the lure.

Figure 15A:
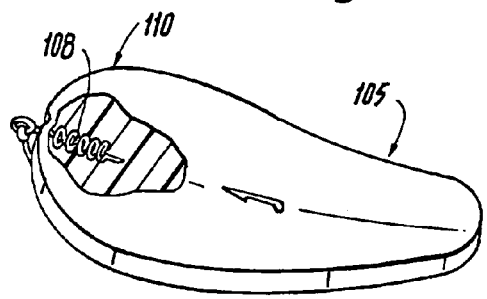
FIG. 15a shows a plan view of a large soft plastic spoon.

FIG. 15a relates to a large spoon lure 105 having a cork screw style wide gap hook 108 at the rear 110 of the lure 105.

Figure 15B:
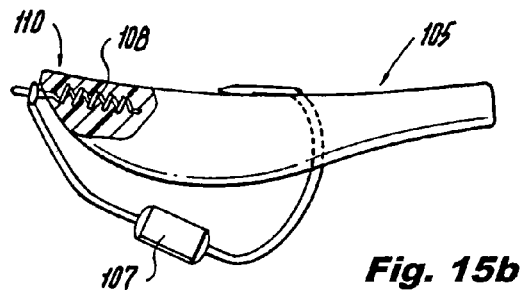
FIG. 15b shows a side view of a large soft plastic spoon.

FIG. 15b relates to FIG. 15a with an adjustable lead weight 107 which can be slid up and down the shank to change the action of the lure.

Figure 16A:
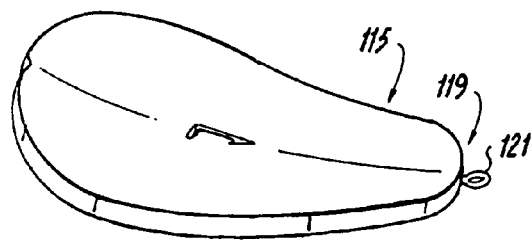
FIG. 16a shows a plan view of a large soft plastic spoon.

FIG. 16a shows a large spoon lure 115, the lure 115 has a wide gap hook Z bend style 121 at the front 119 of the lure 115.

Figure 16B:
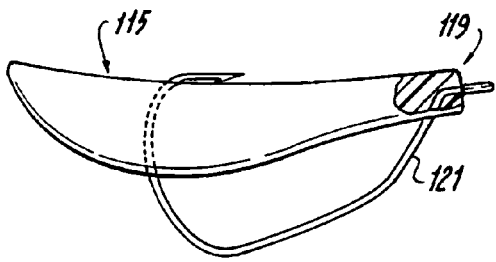
FIG. 16b shows a side view of a large soft plastic spoon.

FIG. 16b shows a side view of what is shown in FIG. 16a.

Figure 17A:
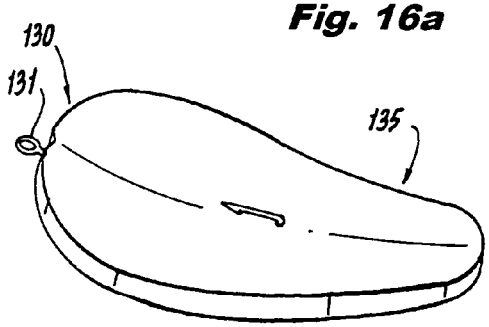
FIG. 17a shows a plan view of a large soft plastic spoon.

FIG. 17a shows a large spoon lure 135 with a rear application 130. The lure 135 has a wide gap hook Z bend style 131 at the rear 130 of the lure 135.

Figure 17B:
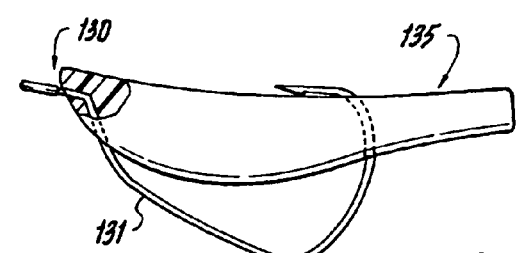
FIG. 17b shows a side view of a large soft plastic spoon.

FIG. 17b shows a side view of FIG. 17a.

FIG. 18a relates to a salmon egg style large spoon lure 145. The lure 145 has the salmon egg style 142. The lure 145 has a post mount wide gap hook 146 located at the rear 140 of the lure 145.

FIG. 18b shows the side view of the embodiment shown in 18a with an adjustable lead weight 147 wherein the weight can be slid up and down the shank to change the action of the lure.

FIG. 19a relates to a salmon egg style large spoon lure 155. The lure 155 has the salmon egg style 152. The lure 155 has a cork screw style wide gap hook 158 located at the rear 150 of the lure 155.

FIG. 19b shows the side view of the embodiment shown in 19a with an adjustable lead weight 157 wherein the weight can be slid up and down the shank to change the action of the lure.

FIG. 20a relates to a salmon egg style large spoon lure 165. The lure 165 has the salmon egg style 162. The lure 165 has a wide gap hook Z bend style 161 at the front 169 of lure 165.

FIG. 20b shows the side view of the embodiment shown in 20a.

FIG. 21a relates to a salmon egg style large spoon lure 175. The lure 175 has the salmon egg style 172. The lure 175 has a wide gap hook Z bend style 171 at the rear 170 of lure 175.

FIG. 21b shows the side view of the embodiment shown in 20a.

Figure 22A:
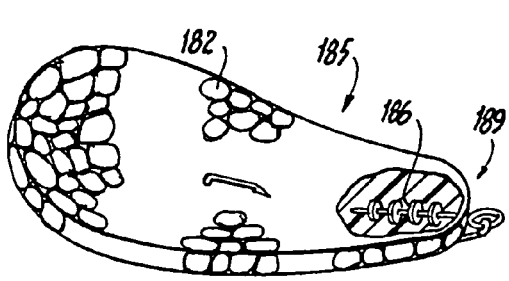
FIG. 22a shows a plan view of a large spoon soft plastic salmon egg spoon body.

FIG. 22a relates to a salmon egg style large spoon lure 185. The lure 185 has the salmon egg style 182. The lure 185 has a post mount wide gap hook 186 located at the front 189 of the lure 185.

Figure 22B:
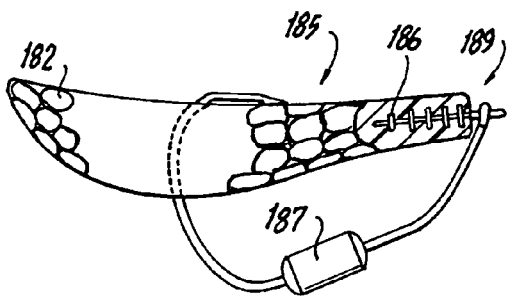
FIG. 22b shows a side view of a large spoon soft plastic salmon egg spoon body.

FIG. 22b shows the side view of the embodiment shown in 22a with an adjustable lead weight 187 wherein the weight can be slid up and down the shank to change the action of the lure.

Figure 23A:
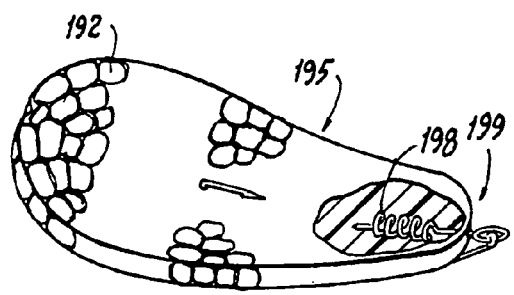
FIG. 23a shows a plan view of a large spoon soft plastic salmon egg spoon body.

FIG. 23a relates to a salmon egg style large spoon lure 195. The lure 195 has the salmon egg style 192. The lure 195 has a cork screw wide gap hook 198 located at the front 199 of the lure 195.

Figure 23B:
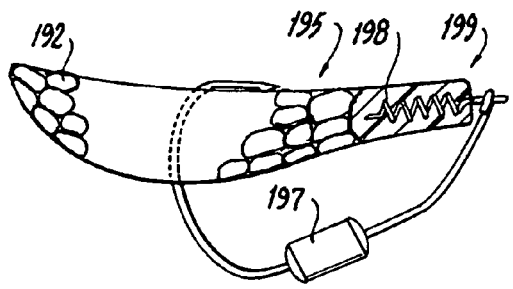
FIG. 23b shows a side view of a large spoon soft plastic salmon egg spoon body.

FIG. 23b shows the side view of the embodiment shown in 23a with an adjustable lead weight 197 wherein the weight can be slid up and down the shank to change the action of the lure.

Figure 24A:
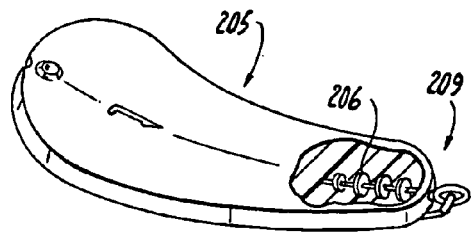
FIG. 24a shows a plan view of a small soft plastic spoon.

FIG. 24a is an embodiment of a small spoon lure 205, the front 209 of lure 205 has a post mount wide gap hook 206.

Figure 24B:
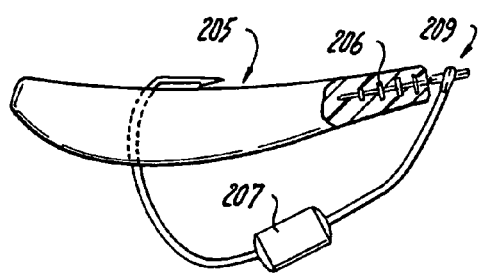
FIG. 24b shows a side view of a small soft plastic spoon.

FIG. 24b shows a side view of the lure 205 showing the front of the lure 209 having a post mount wired gap hook 206 and an adjustable lead weight 207 which can be slid up and down the shank to change the action of the lure.

Figure 25A:
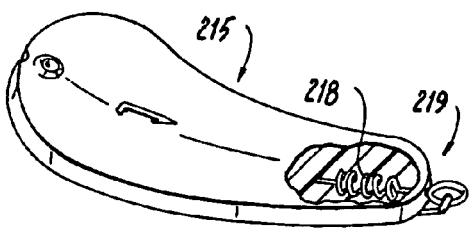
FIG. 25a shows a plan view of a small soft plastic spoon.

FIG. 25a relates to an embodiment of a small spoon lure 215 which has a cork screw style wide gap hook 218 toward the front 219 of the lure 215.

Figure 25B:
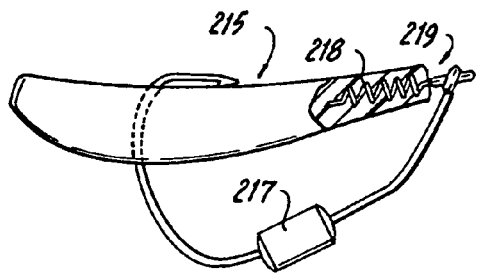
FIG. 25b shows a side view of a small soft plastic spoon.

FIG. 25b shows a side view of the lure in 25a with an adjustable lead weight 217 wherein the weight can be slid up and down the shank to change the action of the lure.

Figure 26A:
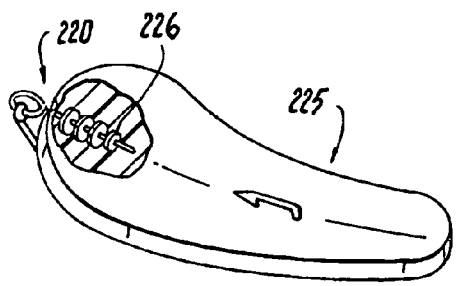
FIG. 26a shows a plan view of a small soft plastic spoon.

FIG. 26a shows a small spoon lure 225 with a rear application 220. The lure 225 has a post mount wide gap hook 226 at the rear 220 of the lure 225.

Figure 26B:
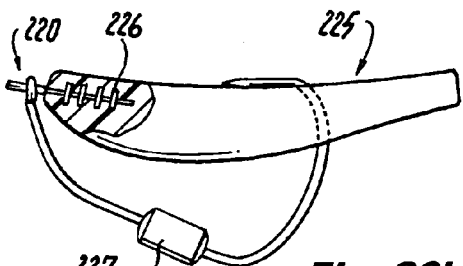
FIG. 26b shows a side view of a small soft plastic spoon.

FIG. 26b shows the lure of 26a with an adjustable lead weight 227 which can be slid up and down the shank to change the action of the lure.

Figure 27A:
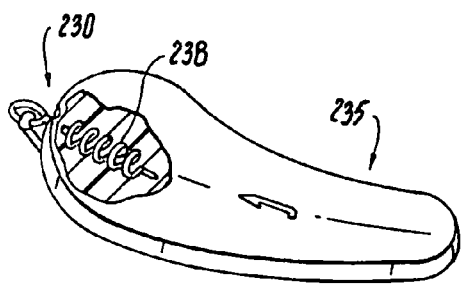
FIG. 27a shows a plan view of a small soft plastic spoon.

FIG. 27a relates to a small spoon lure 235 having a cork screw style wide gap hook 238 at the rear 230 of the lure 235.

Figure 27B:
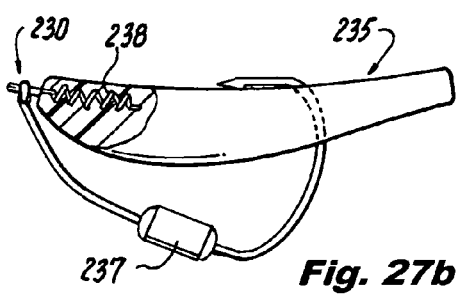
FIG. 27b shows a side view of a small soft plastic spoon.

FIG. 27b shows the side view of FIG. 27a with an adjustable lead weight 237 which can be slid up and down the shank to change the action of the lure.

Figure 28A:
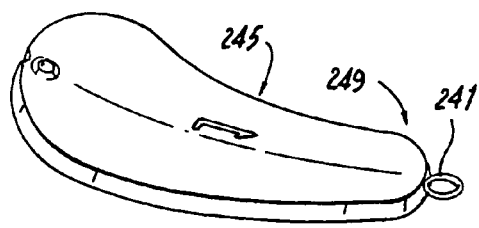
FIG. 28a shows a plan view of a small soft plastic spoon.

FIG. 28a shows a small spoon lure 245, the lure 245 has a wide gap hook Z bend style 241 at the front 249 of the lure 245.

Figure 28B:
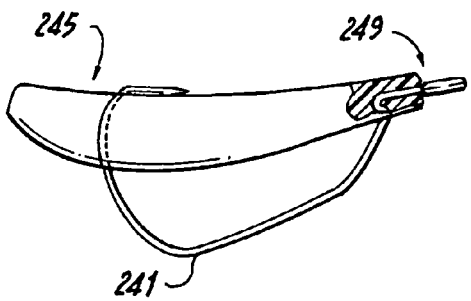
FIG. 28b shows a side view of a small soft plastic spoon.

FIG. 28b shows a side view of what is shown in FIG. 28a.

Figure 29A:
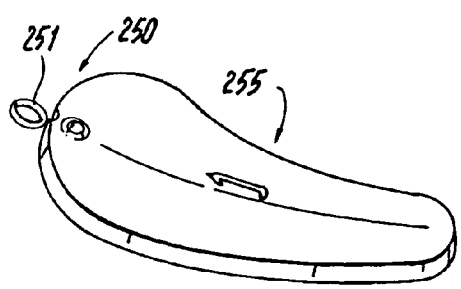
FIG. 29a shows a plan view of a small soft plastic spoon.

FIG. 29a shows a small spoon lure 255 with a rear application 250. The lure 255 has a wide gap hook Z bend style 251 at the rear 250 of the lure 255.

Figure 29B:
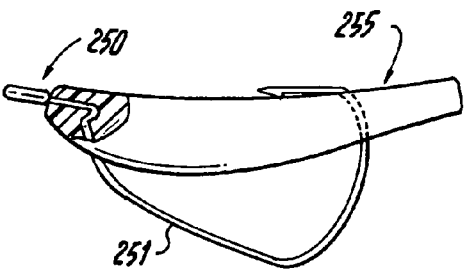
FIG. 29b shows a side view of a small soft plastic spoon.

FIG. 29b shows a side view of FIG. 29a.

Figure 30A:
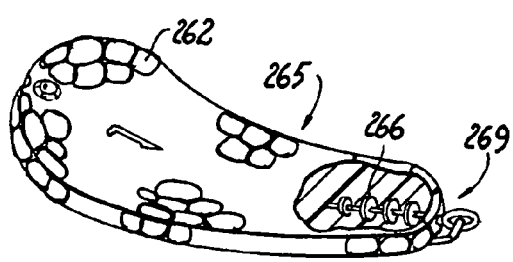
FIG. 30a shows a plan view of a small soft plastic spoon.

FIG. 30a relates to a salmon egg style small spoon lure 265. The lure 265 has the salmon egg style 262. The lure 265 has a post mount wide gap hook 266 located at the front 269 of the lure 265.

Figure 30B:
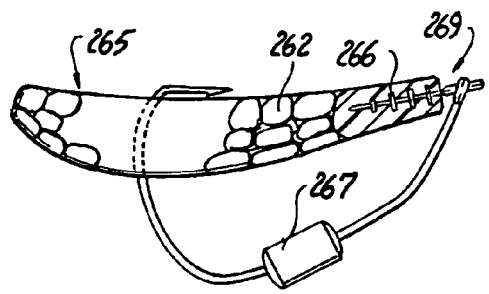
FIG. 30b shows a side view of a small soft plastic spoon.

FIG. 30b shows the side view of the embodiment shown in 30a with an adjustable lead weight 267 wherein the weight can be slid up and down the shank to change the action of the lure.

Figure 31A:
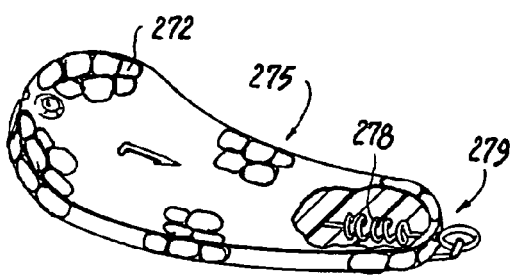
FIG. 31a shows a plan view of a small soft plastic spoon.

FIG. 31a relates to a salmon egg style small spoon lure 275. The lure 275 has the salmon egg style 272. The lure 275 has a cork screw style wide gap hook 278 located at the front 279 of the lure 275.

Figure 31B:
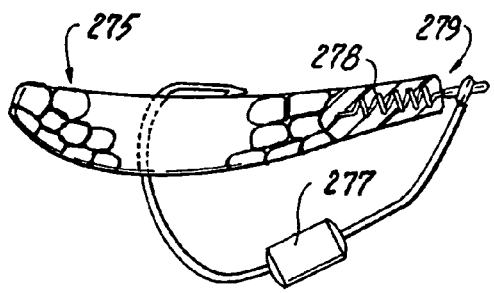
FIG. 31b shows a side view of a small soft plastic spoon.

FIG. 31b shows the side view of the embodiment shown in 31a with an adjustable lead weight 277 wherein the weight can be slid up and down the shank to change the action of the lure.

Figure 32A:
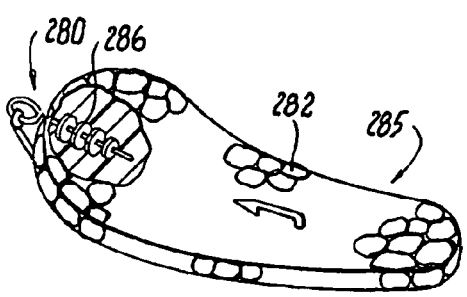
FIG. 32a shows a plan view of a small soft plastic spoon.

FIG. 32a relates to a salmon egg style small spoon lure 285. The lure 285 has the salmon egg style 282. The lure 285 has a post mount wide gap hook 286 at the rear 280 of lure 285.

Figure 32B:
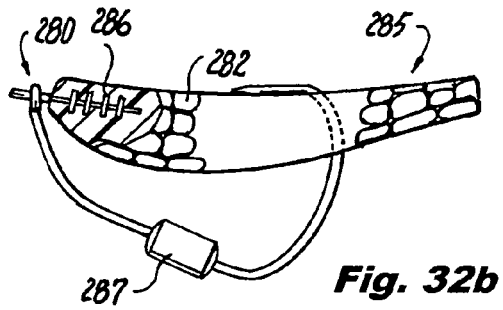
FIG. 32b shows a side view of a small soft plastic spoon.

FIG. 32b shows the side view of the embodiment shown in 32a with an adjustable lead weight 287 wherein the weight can be slid up and down the shank to change the action of the lure.

Figure 33A:
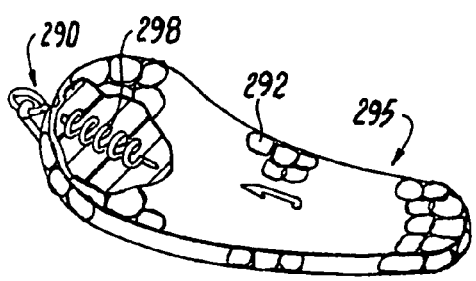
FIG. 33a shows a plan view of a small soft plastic spoon.

FIG. 33a relates to a salmon egg style small spoon lure 295. The lure 295 has the salmon egg style 292. The lure 295 has a cork screw hook 298 at the rear 290 of lure 295.

Figure 33B:
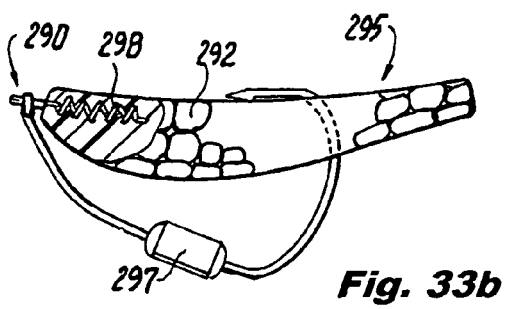
FIG. 33b shows a side view of a small soft plastic spoon.

FIG. 33b shows the side view of the embodiment shown in 33a with an adjustable lead weight 297 wherein the weight can be slid up and down the shank to change the action of the lure.

Figure 34A:
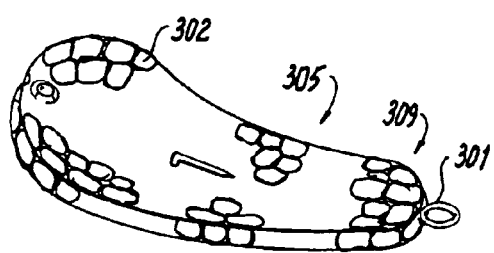
FIG. 34a shows a plan view of a small soft plastic spoon.

FIG. 34a relates to a salmon egg style small spoon lure 305. The lure 305 has the salmon egg style 302. The lure 305 has a wide gap hook Z bend style 301 located at the front 309 of the lure 305.

Figure 34B:
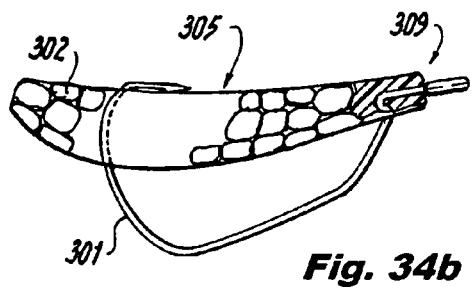
FIG. 34b shows a side view of a small soft plastic spoon.

FIG. 34b shows the side view of the embodiment shown in 34a.

Figure 35A:
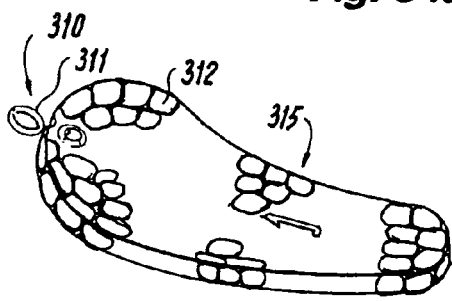
FIG. 35a shows a plan view of a small soft plastic spoon.

FIG. 35a relates to a salmon egg style small spoon lure 315. The lure 315 has the salmon egg style 312. The lure 315 has a wide gap hook Z bend style 311 located at the rear 310 of the lure 315.

Figure 35B:
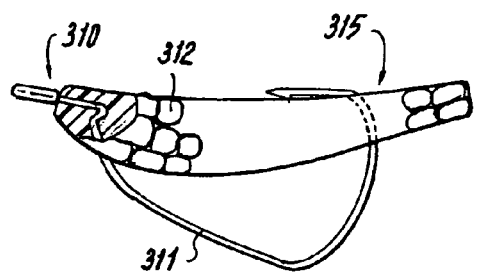
FIG. 35b shows a side view of a small soft plastic spoon.

FIG. 35b shows the side view of the embodiment shown in 35a.

Figure 36A:
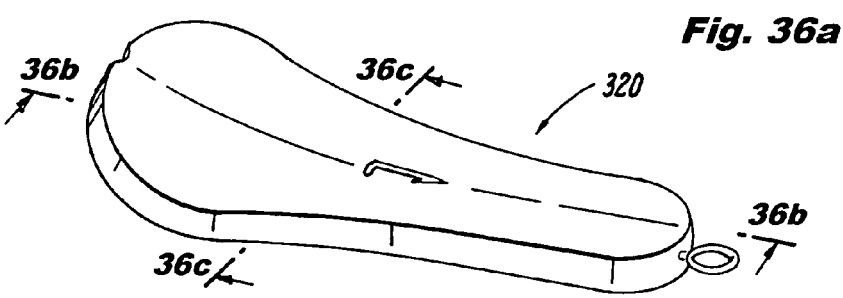
FIG. 36a shows a plan view of a large soft plastic spoon.
Figure 36B:
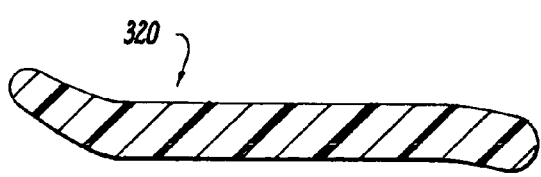
FIG. 36b shows a split section view of a large soft plastic spoon.
Figure 36C:
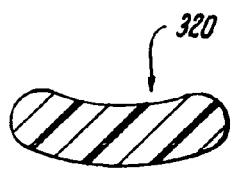
FIG. 36c shows a cross-sectional view of a large soft plastic spoon.

FIGS. 36a, 36b and 36c show a plan view, split section view and cross-section view respectfully of a large spoon lure 320 of the present invention.

Figure 37A:
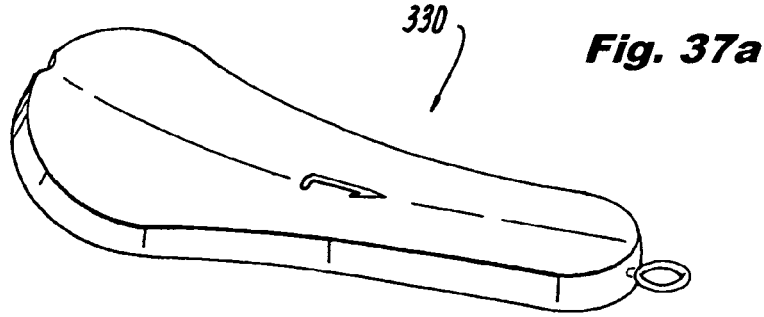
FIG. 37a shows a plan view of a large soft plastic spoon.
Figure 37B:
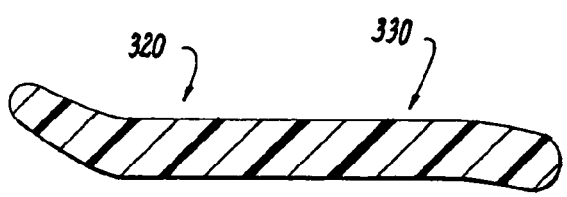
FIG. 37b shows a split section view of a large soft plastic spoon.
Figure 37C:
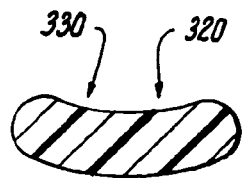
FIG. 37c shows a cross-sectional view of a large soft plastic spoon.

FIGS. 37a, 37b and 37c show a plan view, split section view and cross-section view respectfully of a small spoon lure 330 of the present invention.

Figure 38A:
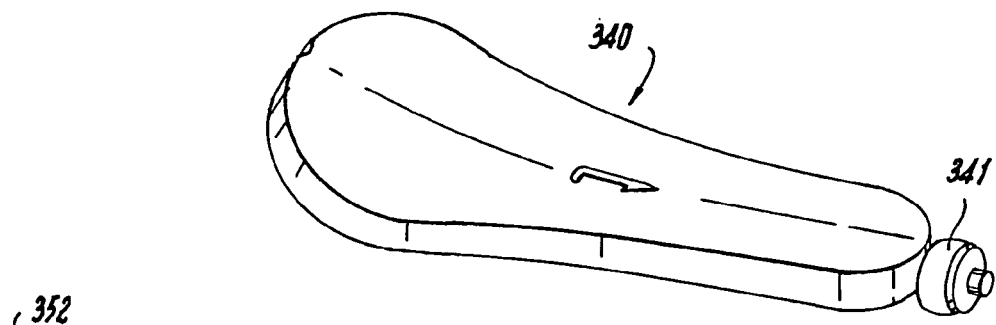
FIG. 38a shows a plan view of a jig head lure.

FIG. 38a shows a large spoon lure 340 with a jig head 341.

Figure 38B:
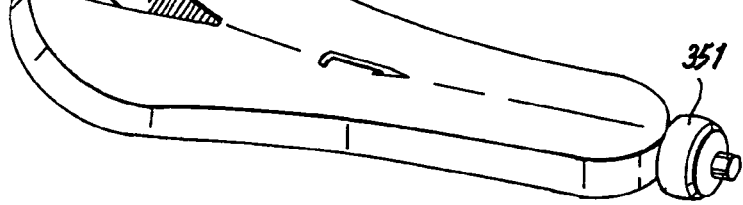
FIG. 38b shows a plan view of a jig head/split tail.

FIG. 38b shows a large spoon lure 350 having a jig head 351 and a split tail 352.

Figure 38C:
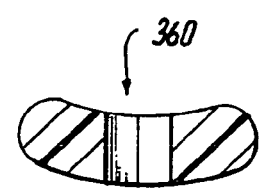
FIG. 38c shows a cross-sectional view of a jig head.

FIG. 38c shows a cross-section 360 of the large spoon lure 350.

Figure 39A:
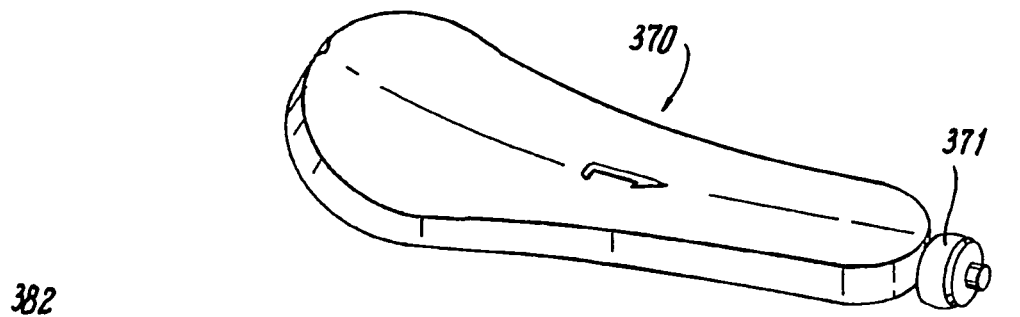
FIG. 39a shows a plan view of a jig head lure.

FIG. 39a shows a small spoon lure 370 with a jig head 371.

Figure 39B:
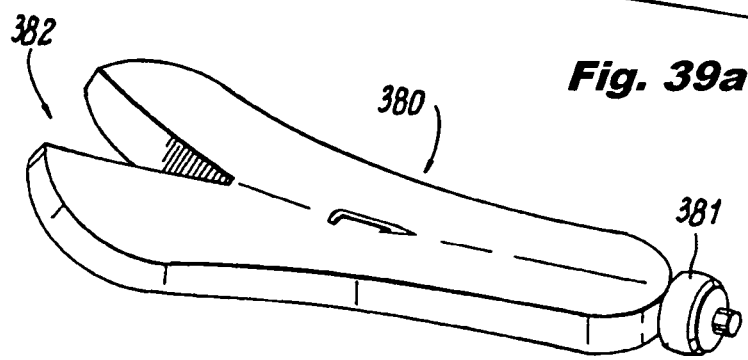
FIG. 39b shows a plan view of a jig head/split tail.

FIG. 39b shows a small spoon lure 380 having a jig head 381 and a split tail 382.

Figure 39C:
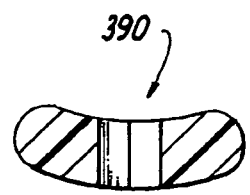
FIG. 39c shows a cross-sectional view of a jig head.

FIG. 39c shows a cross-section 390 of the large spoon lure 380.

Figure 40A:
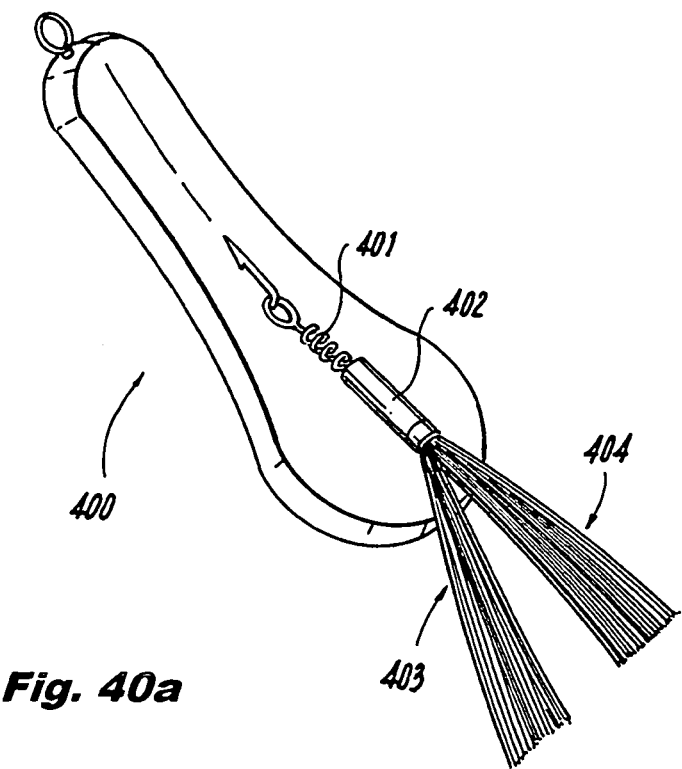
FIG. 40a shows an embodiment of a spoon lure.

FIG. 40a shows a large spoon lure 400 having a hook keeper cork screw mount 401, rattle chamber 402 and soft plastic skirt 403 and 404.

FIG. 41 shows a frog style lure 410.

The lure shown in FIGS. 42a and 43b is reshaped by pinching the rear of the lure and bonding with glue to form a cup in the rear section of the lure. The front section of the lure is also pinched to form a lip or angled front section on an angle to make the lure dives. The cup in the rear makes the lure react in the opposite way. The lip makes the lure dive with a teeter totter action, up and down, not side to side.

FIGS. 42a and b have a post mount wide gap hook 420 or a corkscrew mount wide gap 422, located on the front 424 of the lure 421. The lure 421 has legs 426. In an embodiment, the legs 426 are made of heat shrunk tubing.

The invention claimed is:

1. A fishing lure comprising:
a pliable solid lure made of rubber or soft plastic;
said lure being a spoon lure;
said spoon lure being defined as an oblong, concave lure;
said spoon lure having a bottom surface and a top surface extending along a longitudinal axis of said lure, said bottom surface having a convex shape extending along said longitudinal axis of said lure and said top surface having a concave shape extending along said longitudinal axis of said lure;
said spoon lure having a front section, a back section and a middle section therebetween;
said middle section being a thickest section compared to thicknesses of said front section and said back section;
said front section defining a convexly curved front end of said lure and said back section defining a convexly curved back end of said lure, said convexly curved back end being wider than said convexly curved front end, and said convexly curved front end and said convexly curved back end extending across said longitudinal axis of said fishing lure so as to be symmetrical with respect to the longitudinal axis of said fishing lure;
wherein said lure can be rigged from said front section or alternatively from said back section;
said lure being made so that a hook is put through said lure to be used for catching a fish;
said hook penetrating said bottom and said top of said lure;
said hook directly attached to said lure;
said lure having no protrusions extending from said top of said lure and said top of said lure being planar shaped.

2. The lure of claim 1 wherein said lure is made of plastisol.

3. The lure of claim 1 wherein said hook is a wide gap hook.

4. The lure of claim 3 wherein said hook comprises a push in post, Z-shaped bend or cork screw attachment that is attached on a hook eye of said wide gap hook.

5. The lure of claim 1 wherein said lure is a weedless lure.

6. The lure of claim 1 wherein said lure functions as a surface lure or the spoon lure.

7. The lure of claim 1 wherein said lure acts as a surface lure.

8. The lure of claim 1 wherein said lure acts as a subsurface lure.

9. The lure of claim 1 wherein said lure is retrieved in stop and go or jerk of a rod to which it is to be attached.

10. The lure of claim 1 wherein said lure is jigged off a bottom in a manner of a jig and shad tail lure.

11. The lure of claim 1 wherein said lure is made from a mold.

12. The lure of claim 1 wherein said lure measures approximately 3⅜" by 1 ¼" by ½".

13. The lure of claim 1 wherein said lure is made by a two-piece mold.

14. The lure of claim 1 wherein said lure can function multiple times with multiple fish hooks entered in and removed from said lure.

15. The lure of claim 1 wherein said lure is used on a conventional lead jig head.

16. The lure of claim 1 wherein said lure comprises a salmon egg style.

17. The lure of claim 1 wherein said lure comprises an adjustable lead weight.

18. The lure of claim 17 wherein said adjustable lead weight is slid up and down a shank of said hook which is attached to said lure that changes action of said lure.

* * * * *